United States Patent

[11] 3,588,681

[72] Inventor Glenn W. Murray
 Irvine, Calif.
[21] Appl. No. 831,528
[22] Filed June 9, 1969
[45] Patented June 28, 1971
[73] Assignee North American Rockwell Corporation
 El Segundo, Calif.

[54] SYSTEM FOR PRODUCING ANALOG SIGNALS
 PROPORTIONAL TO THE ANISOTROPHY FIELD
 FOR PLATED WIRE
 2 Claims, 4 Drawing Figs.
[52] U.S. Cl. ..................................................... 324/34
[51] Int. Cl. ............................................... G01r 33/00
[50] Field of Search .......................................... 324/34;
 340/174 (TF), 174 (TC), (Inquired)

[56] References Cited
UNITED STATES PATENTS
3,239,754 3/1966 Odom, Jr. et al. ............ 324/47
3,375,440 3/1968 Morawetz et al. ............ 324/34

*Primary Examiner*—Alfred E. Smith
*Assistant Examiner*—R. J. Corcoran
*Attorneys*—William R. Lane, L. Lee Humphries and Robert G. Rogers ABSTRACT: The wire is magnetized (+ and −) along its longitudinal axis by a field which is large relative to the anisotrophy level of the wire. The resulting change in flux ($d\Phi/dt$) is converted into a pulse having a fixed amplitude and width which is proportional to the anisotrophy field of the wire. The pulse drives a meter calibrated to read the anisotrophy field $H_k$ directly.

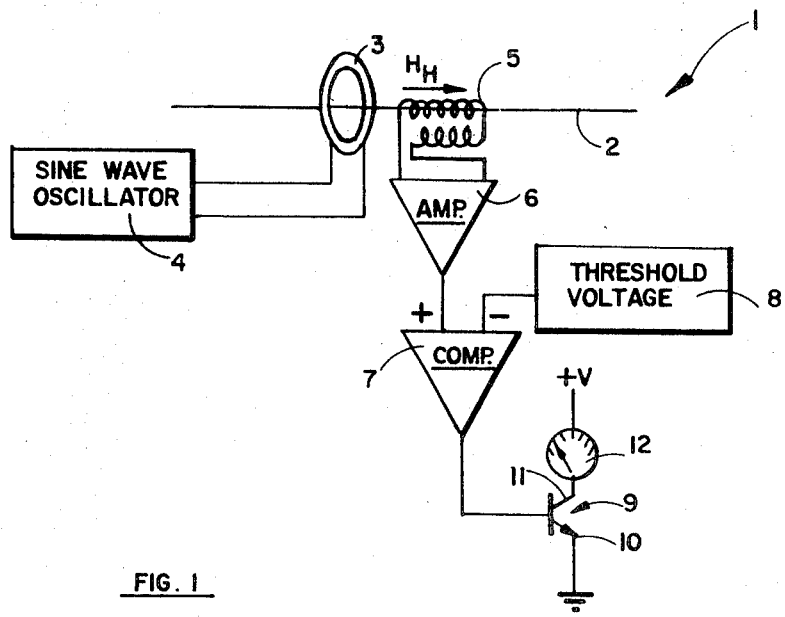
FIG. 1
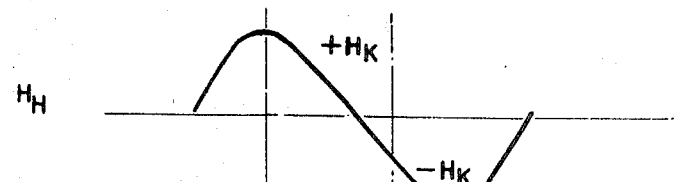
FIG. 2a
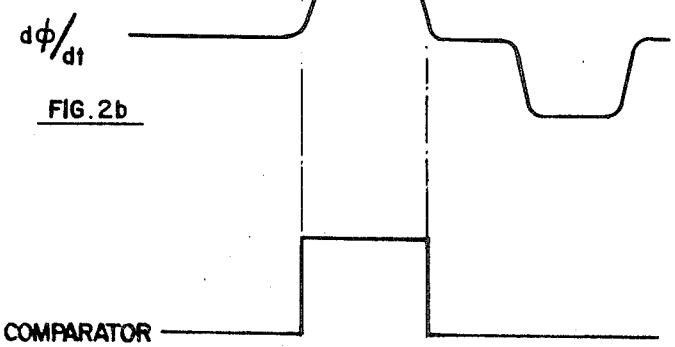
FIG. 2b
FIG. 2c

SYSTEM FOR PRODUCING ANALOG SIGNALS PROPORTIONAL TO THE ANISOTROPHY FIELD FOR PLATED WIRE

BACKGROUND OF THE INVENTION

1. Field of the Invention

The invention relates to a system for producing an analog signal having a width proportional to the anisotrophy field of a plated wire, and more particularly, to such a system in which the signal is produced by measuring the change of flux in the wire as the wire is changed from a saturation in one longitudinal direction to a saturation in the opposite longitudinal direction.

2. Description of Prior Art

In manufacturing plated wire, numerous parameters are monitored in order to detect drifts and to make corrective adjustments to the plating processes. Because of the nature of the application of these various measurements, it is desirable that they be made rapidly, with little interpretation of the test results required. The measurement of the anisotrophy field, $H_k$, of the plated wire is one of the parameters that presents difficulty in this respect. The anisotrophy field, $H_k$, is defined as the magnetic field along the axis of the wire that is required to rotate all of the flux from the easy (circumferential) to the hard (longitudinal) direction.

The measurement of $H_k$ is usually accomplished by applying a sinusoidal magnetic field in the longitudinal direction of the wire. This field, adjusted to be greater than $H_k$, results in the magnetization of the wire being driven to saturation alternately in a plus and minus sense along the longitudinal axis of the wire. A coil around the wire senses a voltage proportional to the time rate of change of flux in the hard direction ($d\Phi/dt$). The voltage is then integrated to obtain a signal proportional to $\Phi$. The signal is applied to the vertical input of an oscilloscope, which also has a signal proportional to the applied magnetic field as a horizontal input. The two signals result in a trace of the hard axis B-H loop being displayed on the scope.

Ideally, the B-H loop would appear as a linear line between the points of saturation. The $H_k$ of the wire would than be measured by determining the value of the magnetic field at which all magnetization was in the hard direction (saturation). In practice, the B-H loop of the wire appears as two separated lines between the points of saturation. It should be obvious that it is difficult to define the point at which the magnetic saturation occurs by using that process. Even if some consistent definition of saturation could be formulated, it would still required an operator to measure $H_k$ from an oscilloscope display.

It would be preferred if this system could be produced to measure $H_k$ directly without requiring a relatively difficult measurement to be made from an oscilloscope display. The present system provides such a capability.

SUMMARY OF THE INVENTION

Briefly, the invention comprises means for applying a sinusoidal field in the longitudinal direction of the plated wire to change the magnetization from a saturation in one direction to a saturation in the other direction. The peak magnetic field is large relative to the anisotrophy field of the plated wire. As a result, the magnetic field is approximately linear from the time it comes out of saturation in one direction and goes into saturation in the opposite direction.

Means are provided for measuring the change of flux in the wire as the wire is driven from saturation in one direction to saturation in the opposite direction. The width of the $d\Phi/dt$ pulse is proportional to the $H_k$ of the wire. Means are further provided for generating an output pulse in response to the $d\Phi/dt$ pulse that has a fixed amplitude and a width proportional to $H_k$. The pulse is used to drive a meter which is calibrated to provide a direct reading of $H_k$.

Therefore, it is an object of this invention to provide a system having a direct meter readout for the anisotrophy field, $H_k$, of a plated wire.

It is another object of this invention to provide a system for generating an analog signal having a width proportion to the anisotrophy field of a plated wire.

A still further object of this invention is to provide a system in which the flux change in the wire is measured as the magnetization of the wire is changed from saturation in one direction to saturation in another direction in response to the application of a magnetic field which is large relative to the $H_k$ of the wire.

A still further object of this invention is to provide an improved system for measuring the anisotrophy field of the plated wire without requiring measurements to be made from an oscilloscope display.

A further object of the invention is to provide an improved system for obtaining an analog signal level which is proportional to the anisotrophy field of a plated wire.

These and other objects of the invention will become more apparent when taken in connection with a description of the drawings, a brief description of which follows:

BRIEF DESCRIPTION OF DRAWINGS

FIG. 1 is a schematic diagram of one embodiment of a circuit for producing a direct readout of the anisotrophy field, $H_k$, of a plated wire.

FIGS. 2a, 2b, and 2c are diagrams of the signals generated by the FIG. 1 circuit.

DESCRIPTION OF THE PREFERRED EMBODIMENT

FIG. 1 is a schematic diagram of one embodiment of system 1 for producing a direct meter readout of the anisotrophy field $H_k$ of the plated wire 2. Drive coil 3 is disposed about plated wire 2 and is connected to sine wave oscillator 4. The sine wave oscillator 4 generates a sinusoidal signal for inducing a sinusoidal magnetic field $H_h$ in the plated wire through coil 3.

The system further comprises pickup coil 5, consisting of two coils, one disposed about wire 2 and a second identical coil adjacent to the coil around wire 2. These coils are connected in such a manner that the voltage induced in coil 5 by the applied field H is zero. A voltage will then be generated on coil 5 proportional only to the time rate of change of the flux in wire 2 in the longitudinal direction. The pickup coil is connected to amplifier 6, which amplifies the $d\Phi/dt$ voltage pulse from the pickup coil. The output of amplifier 6 provides one input to comparator 7, labeled as plus (+). The other input to the comparator, labeled minus (−), is provided from threshold voltage generator 8.

The comparator may be implemented by a switching circuit biased to nonconduction by the voltage from generator 8 until a predetermined positive voltage is sensed from amplifier 6. When the positive voltage from amplifier 6 exceeds the negative voltage provided by generator 8, the comparator is turned on to provide an output drive signal to the base of transistor 9, which has its emitter 10 connected to electrical ground. The collector 11 of the transistor is connected through meter 12 to voltage source +V. The transistor is turned on by the pulse from comparator 7.

Meter 12 is calibrated so that it provides a direct meter reading which represents the anisotrophy $H_k$ of the wire. The meter may be implemented by an average reading DC ampmeter. As a result, the output of the meter is directly proportional to the pulse width of the pulse from comparator 7 and indicates the $H_k$ of the wire as indicated previously.

The operation of the system may be understood by referring to FIG. 2. The magnetic field, $H_H$, applied to the wire by the sinusoidal signal from sine-wave oscillator 4 is shown as FIG. 2a. The sinusoidal signal is relatively large so that the induced magnetic field is large as compared to the $H_k$ of the wire. For example, the $H_H$ should be from 1.5 to 2 times the $H_k$. As a result, the magnetic field $H_H$ applied to the wire is approximately linear between the $+H_k$ and $-H_k$ points on the FIG. 2a signal. $+H_k$ indicates saturation in one direction along the wire, and $-H_k$ indicates saturation in the opposite direction along the wire.

As the wire comes out of saturation, the time rate of change of flux goes from zero to essentially some constant value. FIG. 2b illustrates the time rate change of flux, $d\Phi/dt$, between the points of saturation.

Since the applied field, $H_H$, is approximately a linear function of time between the points of saturation, the time width of the $d\Phi/dt$ pulse is seen to be proportional to $2H_k$.

FIG. 2c represents the output pulse from comparator 7 which has a width equal to the distance between $H_k$ and $-H_k$. The width changes as a function of the $H_k$ of a wire being tested.

The output voltage from generator 8 has a magnitude which enables comparator 7 to generate a sharp output pulse as the $d\Phi/dt$ signal goes positive. The output from generator 8 can be changed so that the comparator may be triggered at any point along the $d\Phi/dt$ pulse. Ordinarily, the threshold is set so that comparator 7 fires, or is turned on, just as the $d\Phi/dt$ voltage pulse begins to increase in a positive direction. As a result, the output of the comparator is a pulse with a fixed amplitude and a width proportional to $H_k$. The pulse switches transistor 9 on for the period of the pulse. The current through transistor 9 is time averaged by meter 12. Since the amplitude of the pulse applied to the meter is constant, the meter reading is proportional to the applied pulse width, which is in turn proportional to $H_k$. Thus the meter may be calibrated to read $H_k$. Therefore, it should be obvious that a direct meter output showing the $H_k$ of the wire can be read easily as each plated wire is tested.

I claim:

1. A system for producing an analog signal level proportional to the anisotrophy field of a plated wire, said system comprising, means for inducing a magnetic field in the plated wire along the hard axis of the wire for changing the magnetic saturation of the wire from saturation in one longitudinal direction along the wire to saturation in the opposite longitudinal direction along the wire, means for detecting a change in the flux in said wire as the saturation of the wire changes for generating a signal representing said change in flux, comparator means for receiving as one input the signal representing the change of flux in said wire, and threshold generator means for providing a second input to said comparator means for controlling the width of the output signal from said comparator, said second input being adjustable for producing a signal from said comparator having a width precisely related to the anisotrophy field of the wire.

2. The combination recited in claim 1, including meter means responsive to the output from said comparator for providing a direct readout representing the anisotrophy of the wire.